June 2, 1959 T. L. DINSMORE ET AL 2,889,191

MOUNTING OF SHEET RECORDS

Filed Nov. 12, 1954

INVENTORS
Thomas L. Dinsmore
BY Arthur G. Thorp, 2d.
George H. Fritzinger
Agt.

2,889,191
Patented June 2, 1959

2,889,191

MOUNTING OF SHEET RECORDS

Thomas L. Dinsmore, West Orange, and Arthur G. Thorp II, Whippany, N.J., assignors, by mesne assignments, to McGraw-Edison Company, Elgin, Ill., a corporation of Delaware Application November 12, 1954, Serial No. 468,442

4 Claims. (Cl. 346—138)

This invention relates to a machine in which flexible sheet records are mounted removably on a revolvable support having an endless record-supporting surface, and is concerned particularly with means for presenting a sheet record reliably into a proper loading position for attachment to the support and with means for accurately registering the sheet record with the support while providing for its drive in both advancing and backfeeding directions.

The present invention is adapted especially for use with magnetic recording and reproducing machines which employ a thin, flexible sheet record coated with magnetizable particles and wrapped through substantially at least one full revolution around the record support with attachment of the sheet record thereto to provide for drive of the sheet record therewith. In such machines a magnetic head is propelled slowly across the record support as the latter is rotated to cause the head to scan a helical track on the sheet record with repeated crossing of the joint between the leading and trailing edges thereof. When the sheet record is removed from the support and laid out flat, the scanning track appears as a series of side-by-side parallel lines.

It is necessary that the sheet record be mounted always in the same position on the support so that the individual parallel lines will re-form a continuous helical track when a sheet record is remounted on a machine for playback or transcription. A satisfactory means for attaching the sheet record to the support comprises a pair of hooks projecting from the peripheral surface of the support for engagement with a pair of complementary holes in leading corner portions of the sheet record as shown, for example, in the Roberts Patent 2,653,819, dated September 29, 1953. It is to be understood however that no unnecessary limitation of the invention to this type of attaching means is intended.

Attaching means in the form of hooks on the record support have the advantage that when a sheet record is placed into a definite loading position, wherein the leading edge extends across the support in substantially tangential relation thereto, the hooks will pick up the sheet record automatically as the support is advanced. Similarly, upon placing a stripping plate in close proximity to the support and reversely rotating the support, the sheet record is stripped from the support and disengaged automatically from the hooks.

It is important that the sheet record be located accurately in loading position and that it be in a free state at the instant it is picked up by the hooks so that no tearing or distorting forces will be exerted on the drive holes in the leading corner portions of the sheet record. This is particularly important in view of the desirability of using relatively thin sheet records of only a few thousands of an inch thickness. It has been heretofore proposed that the sheet record be held manually in a loading position until it is picked up by the hooks. It is however not permissible from a practical standpoint to permit the operator to keep his hand on the sheet record to the very instant that the sheet record becomes attached to the record support not only because of the limited tear resistance of the sheet record material but also because the operator cannot time his release at the instant the hooks begin to draw the sheet record onto the support, and he cannot reliably hold the sheet record so lightly as not to apply undue restraining forces thereon during its feed into the machine.

An object of our invention is to provide an improved loading apparatus for sheet record machines which is adapted to receive the sheet record with forced removal of the operator's hands therefrom when the sheet record reaches a proper loading position.

Another object is to provide a loading apparatus which is adapted to receive the sheet record through its full length and to place the sheet record in a correct loading position when the sheet record is fully inserted into the loading apparatus.

Another object is to provide a sheet record machine with a loading slot having a length equal approximately to that of the sheet record so that the sheet record cannot be pushed into the machine beyond a certain point representing a correct loading position.

Another object is to provide a sheet record machine with such loading slot which not only prevents the operator from holding the sheet record in a restraining manner when the sheet record reaches a correct loading position but which also leaves the sheet record in a free state for pick-up by an attaching means on the record support as the record support is advanced.

Another object is to provide a loading apparatus for a sheet record machine which has a slot for receiving a sheet record into a correct loading position, one wall of which slot is adapted to serve as a stripping plate for stripping the sheet record from the support and directing it through said slot in a reverse direction as the support is reversely rotated.

Another object is to provide for drive of a sheet record with a revolvable record support at both its leading and trailing edges while accurately registering the sheet record with the support.

Another object is to provide a record support and sheet record with inter engageable fastening means at both the leading and trailing edges of the sheet record, which fastening means is adapted to permit shifting movement of the sheet record into correct registration with the record support in response to a record-positioning means on the support.

These and other objects and features of our invention will be apparent from the following description and the appended claims.

In the description of our invention reference is had to the accompanying drawings, of which:

Figures 1, 2:
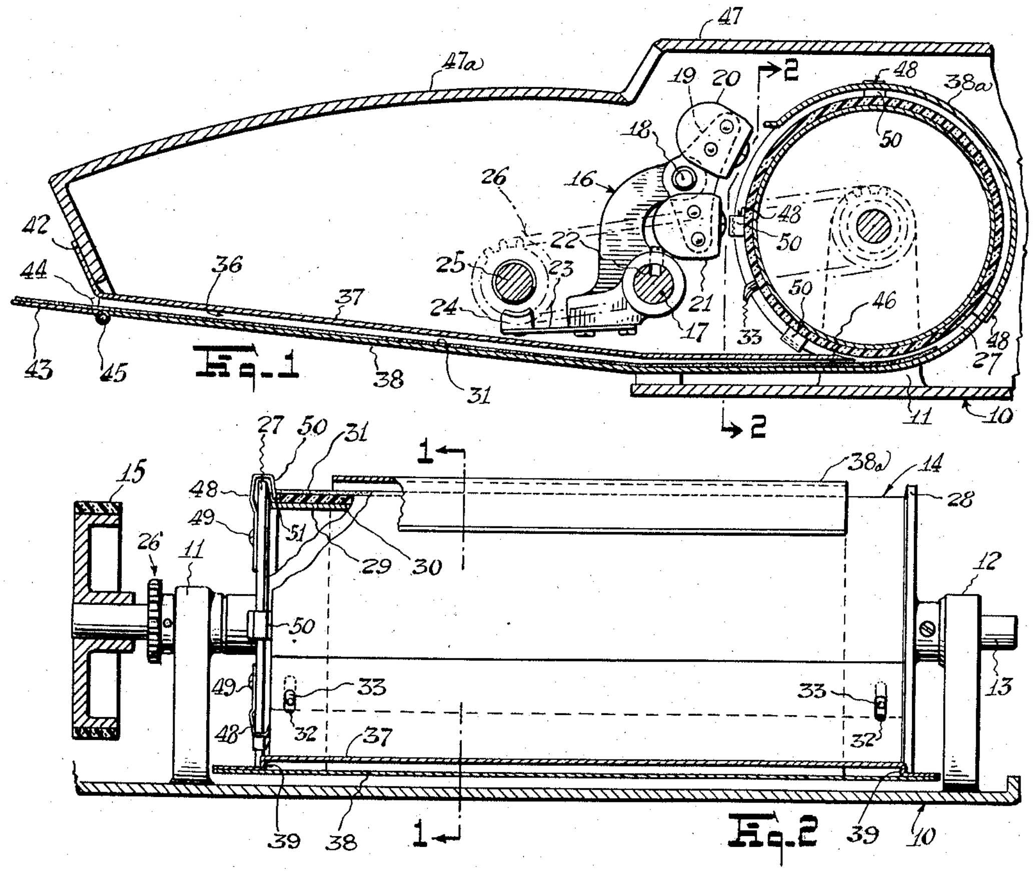
Figure 1 is a fractional, sectional view of a magnetic recording machine taken on the line 1—1 of Figure 2 and illustrating our invention.
Figure 2 is another fractional, sectional view taken substantially on the line 2—2 of Figure 1.
Figure 3:
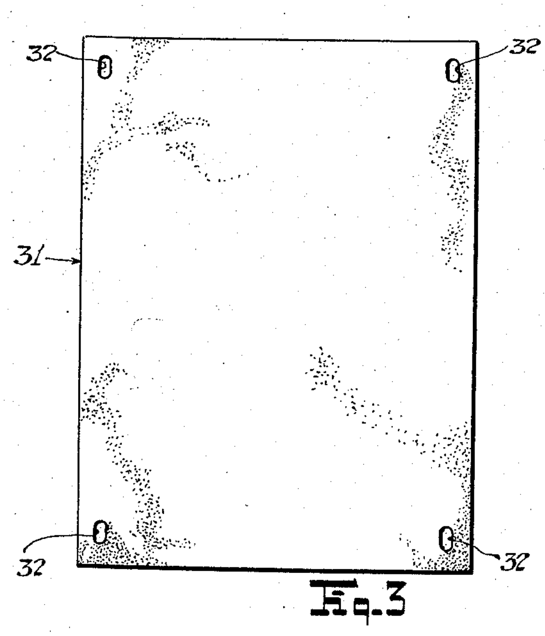
Figure 3 is a view of a sheet record usable with the sheet record machine of Figures 1 and 2.

The sheet record magnetic recording and reproducing machine shown in the accompanying drawings may have a base plate 10 provided with laterally-spaced upright standards 11 and 12. These standards have bearings for a shaft 13 carrying a rotatable record support in the form, for example, of a drum 14. The drum is rotated by suitable drive mechanism only fractionally shown as comprising a drive wheel 15 mounted on one end of the shaft 13. At the front of the drum 14 there is a carriage 16 mounted slidably on a cross rod 17 for lateral movement along the drum. Pivoted at 18 to this carriage is a rocker beam 19 onto one end of which is mounted an erasing head 20 and onto the other end of which is mounted a record-reproduce head 21. The carriage 16 can be rocked rearwardly and forwardly to place the heads into and out of engagement with the record support. For this purpose the carriage is splined at 22 to the support rod 17 so that the shifting of the carriage is accomplished by turning the rod itself. Mounted on the carriage is a cantilever spring 23 carrying a feed nut 24 which is moved into and out of engagement with a feed screw 25 concurrently as the carriage is rocked back and forth to place the heads into and out of engagement with the record support. This feed screw has a constant drive coupling with the shaft 13 as by means of a chain drive fractionally indicated at 26. The feed screw and support rod 17 are mounted in suitable bearings at their ends which need not however be herein shown.

The drum 14 has flanges 27 and 28 at its ends which are bridged by a tubular member 29 covered by a resilient material 30 such as rubber to provide a yieldable backing for a sheet record 31 mounted thereon. The sheet record has drive holes or eyelets 32 in its leading corner portions which are engaged by respective hooks 33 at opposite ends of the drum to provide for drive of the sheet record with the record support as the record support is advanced.

The two heads 20 and 21 are preferably positioned to contact the sheet record in a plane at right angles to the shaft 13 so that they ride in the same track on the record. In response to suitable biasing of the carriage they engage the sheet record with necessary pressure to have firm contact with the record. When the drum is driven in an advancing direction, the heads are moved progressively along the drum to describe the helical track aforementioned, with the erase head being in advance of the record head to erase any prior recording on the track. Of course, during reproducing, the erase head is disabled. The audio circuits of the machine for feeding energy to and from the heads need not be herein described for the purposes of the present invention.

The particular form of sheet record machine so far described is intended only as illustrative to provide a background for an understanding of our invention herein next described.

The mounting of a sheet record onto the record support involves firstly a placing of the sheet record into a proper loading position wherein the leading edge of the sheet record is in close proximity to the drum 14 and the drive holes 32 are substantially centered with respect to a plane through the center of the drum. When the drum is advanced after having placed the sheet record in such correct loading position, the hooks 33 will first deflect the corner portions of the sheet record outwardly and then, when they become aligned with the holes 32, the sheet record will flex inwardly in response to its natural resilience to cause the sheet record to be attached to the drum. Since the attachment is made while the drum is being rotated, it is important that no restraining forces be applied to the sheet record at the instant it is picked up by the hooks else the record may be torn or be distorted out of shape. By our invention a reliable loading apparatus is provided which is adapted to enable accurate positioning of the sheet record in loading position and which forces the operator to remove his hands from the sheet record when it reaches the loading position, leaving the sheet record in a free state for its pick-up by the hooks on the drum 14.

Figure 4:
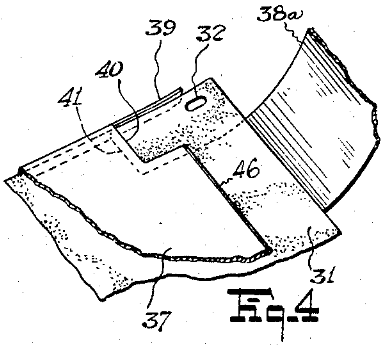
Figure 4 is a fractional, perspective view of a terminal portion of the sheet record loading apparatus showing fractionally a sheet record in loading position relative thereto.

The loading apparatus is provided with a loading slot 36 at least approximately as long as the sheet record 31 to be mounted on the drum. This loading slot is formed throughout its major length by a pair of spaced plates 37 and 38 having turned-over edges 39 closing the slot at its sides. The plate 37—which is the one nearer the drum—terminates just short of the drum on a line tangential thereto, but the other plate 38 is extended in spaced relation to the drum to form a continuation of the slot 36. Preferably, the plate 38 is provided with an arcuate extension **38*a* which surrounds a major portion of the drum in spaced relation thereto, leaving only a gap between its terminal edge and the plate 37 for engagement of the heads with the record. Thus, this arcuate extension forms a guard effective throughout the major distance around the drum to retain a mounted sheet record in close proximity to the drum. As shown in Figure 4, the plate 37 has the corner portions thereof adjacent the drum cut away, as at 40, so that it will clear the hooks 33. Likewise, starting at about the same point, as at 41, the sides of the plate 38 and its arcuate extension 38*a* are cut away, at some distance inwardly from the side edges of the sheet record, so that it too will clear the hooks and provide for positive attachment of the sheet record with the hooks as will appear, it being understood that the hooks are made substantially longer than the distance of spacing of the extension 38*a*** from the drum.

The forward end of the loading slot is preferably provided with an outwardly-flared opening to facilitate the insertion of the sheet record into the slot. The flared opening may be formed between an upper inclined wall 42 forming a continuation of the wall 37 and a lower member 43 forming a continuation of the wall 38. When the sheet record is inserted into the loading slot 35 to a point where the trailing edge is just even with the outer edge of the member 43, it is correctly located in loading position. However, some variation in the loading position of the sheet record may be tolerated as between its loading position just defined and the position wherein its trailing edge is at the apex 44 of the flared opening of the loading slot.

The member 43 is preferably hinged to the wall 38, as at 45, to form a door for closing the loading slot at the front of the machine. When this door is closed it is in a non-projecting position in juxtaposition with the wall 42. After inserting the sheet record into the slot, the member or door 43 may be closed to conceal the trailing edge of the sheet record while providing a narrow slot between it and the wall 42 to provide a slight drag resistance on the sheet record to retain it in correct loading position.

Upon next advancing the drum 14, either manually or by the drive mechanism, while the sheet record is in correct loading position shown for example in Figure 1, the hooks 33 will move through the cutaway 40 and deflect the side portions of the sheet record downwardly beyond the arcuate plate **38*a*. When the hooks come into registration with the drive holes 32**, the side portions move upwardly in response to the natural resilience of the sheet record material, causing the sheet record to be engaged by the hooks and to be drawn from the slot into wrap-around relation with the drum.

The plate 37 is terminated in an edge 46 in close proximity to the drum 14 so that it will serve as a stripping member that will engage the under side of the trailing edge of the sheet record and strip the record from the drum as the drum is reversely rotated. Not only does the plate 37 thus serve as a stripping member but also, in cooperation with the side edges 39 and the plate 38, it directs the sheet record into and through the loading slot in a reverse direction as the drum is reversely rotated. Upon the door 43 being opened the trailing edge will appear beyond the apex 44 of the flared opening of the loading slot when the hooks 33 become disengaged from the sheet record. The trailing edge of the sheet record may then be picked up by the fingers to enable the record to be withdrawn from the machine.

The machine is provided with a cabinet 47 having a forward portion *47a* ahead of the drum 14 extending through the length of the loading apparatus. The plates 37 and 38 forming the loading slot are desirably positioned at the bottom of the cabinet in horizontal positions inclined slightly forwardly and upwardly from the base 10 as shown in Figure 1.

During ejection of the sheet record it is desirable to provide for positive drive of the trailing edge of the record with the drum until the trailing edge is engaged by the stripping plate 37. For this purpose the trailing corners of the sheet record are also provided with drive holes 32 for interengagement with hooks on the drum 14. Preferably, the trailing edge is caused to overlap the leading edge so that the trailing holes of the sheet record will be in partial alignment with the corresponding holes in the leading portion of the sheet record when the sheet record is fully wrapped onto the periphery of the drum. The same hooks 33 may then engage both the leading and trailing corners to provide for positive drive of the sheet record with the record support in both advancing and backfeeding directions. A feature of the invention is to make all of the drive holes 32 oversized relative to the hooks 33 so that the sheet record will have lateral freedom of motion for correct registration with the record support in response to a sheet record registering or locating means on the drum herein next described.

The sheet record locating means may be of the form described in the pending Bobb application Serial No. 408,198, filed February 4, 1954. This locating means comprises the flange 28 at the right side of the drum forming an abutment for the right side edge of the sheet record. In order to establish and maintain contact of the right edge of the sheet record with the flange 28, a plurality of light cantilever springs 48—four being shown by way of example—are mounted on the left wall of the drum at intervals about the shaft 13. The springs are secured at their inner ends to the drum by screws 49, and extend radially outwardly with respect to the drum. At points beyond the flange 27 they are bent rightwardly to extend across the flange at a clearance distance therefrom, and at a short distance beyond the inner side of the flange 27 they are bent radially inwardly, terminating in short fingers 50 which engage recesses 51 in the record-supporting wall 30. The fingers 50 are inclined slightly away from the flange 27 so that they lie at obtuse angles to the record-supporting surface of the drum. Likewise, the inner abutting surface of the flange 28 at the right side of the drum is also inclined slightly to be at obtuse angles to the record-supporting surface.

The distance between the inclined confronting faces of the flange 28 and the fingers 50 is slightly greater than the width of the sheet record at their outer edges and is slightly less than the width of the sheet record at their inner edges on a level with the record-supporting surface. Thus, upon wrapping a sheet record onto the periphery of the drum the spring fingers 50 are deflected slightly outwardly with resultant sidewise pressure exerted against the sheet record to maintain it in contact with the fixed flange 28. Thus, the location of the sheet record is always determined by the inner locating surface of the flange 28 to provide accurate registration of the sheet record with the drum. It is by making the drive holes 32 in the sheet record slightly oversize with respect to the hooks 33 that the sheet record has a lateral freedom of motion while in drive engagement with the record support to permit it to conform to the record-positioning means on the drum.

The embodiment of our invention herein particularly shown and described is intended as illustrative and not necessarily limitative of our invention since the same is subject to changes and modifications without departure from the scope of our invention, which we endeavor to set forth by the following claims.

We claim:

1. In a dictation machine: the combination of a flexible and substantially rectangular sheet record; a revolvable record support having an endless peripheral surface for carrying said sheet record in the form of a closed loop; sheet record fastening means providing for drive of the sheet record with the support in both advancing and backfeeding directions, comprising fastening elements on said support and complementary means on both the leading and trailing portions of the sheet record loosely cooperable with said fastening elements to provide for drive of the sheet record with the support in both advancing and backfeeding directions while allowing lateral shifting of the sheet record relative to the support; and sheet record locating means on said support comprising an abutment at one end of said support, and means engageable with one side edge of said sheet record for exerting sidewise pressure on the sheet record to maintain its other side edge in contact with said abutment while the sheet record is in driving engagement with said fastening elements.

2. In a dictation machine: the combination of a flexible sheet record; a revolvable record support having an endless peripheral surface for carrying said sheet record in wrap-around relation thereto, said sheet record having apertured corner portions at both its leading and trailing edges of such length that when wrapped about said support the corner portions thereof overlap with the apertures at each side of the sheet being in at least partial alignment with each other; a projecting fastening element at each end of said support adapted for loose engagement with said aligned apertures of said overlapped corner portions to provide for drive of the sheet record with the support in both advancing and backfeeding directions while allowing for lateral shifting of the sheet record relative to the support; a limiting stop means at one end of said support; and means engageable with said sheet record for applying a force to urge the sheet record laterally against said stop means while the sheet record is in driving engagement with said fastening elements.

3. In a machine having a record support revolvable about a substantially horizontal axis and provided with a periphery about which a flexible sheet record equal at least approximately in length to that of said periphery is adapted to be wrapped with its leading edge attached to said support: the combination of a loading structure comprising tubular means leading from a forward portion of the machine in tangential relation to said support and having a wall extending onwardly at least partially along the supporting surface of said support in spaced parallel relation thereto to form a narrow slot leading to said support and at least partially therearound, said tubular means being adapted for receiving a flexible sheet record edgewise into a loading position wherein a leading edge portion of the sheet record overlaps a portion of said record-supporting periphery; means on said support engageable with said leading edge portion of the sheet record when the sheet record is in loading position for attaching the sheet record to said support, said tubular means having a length leading from a point of tangency of the tubular means with said record support equal approximately to the length of the sheet record whereby said loading position of the sheet record is defined by insertion of the sheet record throughout just its full length into said slot.

4. In a machine including a housing and having a revolvable record support with a periphery about which a flexible sheet record is adapted to be wrapped with its leading edge attached to said support: the combination of a loading tube totally within said housing and extending from a sidewall of the housing generally along the base thereof into tangential relation to said record support, said loading tube having a rectangular slot for receiving said sheet record leading edge first while the sheet record is in a flat condition, and said loading tube having a length causing a leading portion of the sheet record to lap a portion of said record support when the sheet record is in a loading position wherein it is inserted just throughout its full length into said loading tube; and sheet record attaching means comprising attaching elements on said support and cooperable means in the leading portion of the sheet record interengageable by advance movement of said support while the sheet record is in said loading position.

References Cited in the file of this patent

UNITED STATES PATENTS

| | | |
|---|---|---|
| 1,307,257 | Jameson | June 17, 1919 |
| 1,454,818 | Jones | May 8, 1923 |
| 2,653,819 | Roberts | Sept. 29, 1953 |
| 2,666,808 | Cooley | Jan. 19, 1954 |
| 2,701,177 | Rennes | Feb. 1, 1955 |
| 2,729,453 | Camras | Jan. 3, 1956 |